US010260531B2

(12) United States Patent
Kondo et al.

(10) Patent No.: US 10,260,531 B2
(45) Date of Patent: Apr. 16, 2019

(54) HYDRAULIC DRIVE SYSTEM

(71) Applicant: KAWASAKI JUKOGYO KABUSHIKI KAISHA, Kobe-shi, Hyogo (JP)

(72) Inventors: Akihiro Kondo, Nishinomiya (JP); Makoto Ito, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 125 days.

(21) Appl. No.: 15/543,873

(22) PCT Filed: Dec. 9, 2016

(86) PCT No.: PCT/JP2016/086766
§ 371 (c)(1),
(2) Date: Jul. 14, 2017

(87) PCT Pub. No.: WO2017/099230
PCT Pub. Date: Jun. 15, 2017

(65) Prior Publication Data
US 2017/0370382 A1 Dec. 28, 2017

(30) Foreign Application Priority Data
Dec. 10, 2015 (JP) ................................ 2015-240762

(51) Int. Cl.
*F16D 31/02* (2006.01)
*F15B 11/16* (2006.01)
(Continued)

(52) U.S. Cl.
CPC .......... *F15B 11/166* (2013.01); *E02F 9/2004* (2013.01); *E02F 9/2232* (2013.01);
(Continued)

(58) Field of Classification Search
CPC ...... F15B 11/165; F15B 11/166; F15B 21/08; F15B 21/087
(Continued)

(56) References Cited

U.S. PATENT DOCUMENTS 5,249,421 A * 10/1993 Lunzman .............. F15B 21/087 60/422
5,289,679 A * 3/1994 Yasuda ................. F15B 11/163 60/422
(Continued)

FOREIGN PATENT DOCUMENTS

JP 2010-196780 A 9/2010

OTHER PUBLICATIONS

Feb. 28, 2017 Search Report issued in International Patent Application No. PCT/JP2016/086766.

*Primary Examiner* — Michael Leslie
(74) *Attorney, Agent, or Firm* — Oliff PLC

(57) ABSTRACT

A hydraulic drive system includes control valve and operating devices, a variable displacement pump, and a flow regulator. When an operating lever inclination angle becomes a value, a control valve opening area becomes a reference. When the operating lever inclination angle maximizes, the opening area maximizes. The flow regulator: until the operating lever inclination angle becomes the value, increases the pump discharge flow rate with the inclination angle, so a differential pressure between pump discharge and actuator load pressures is constant; when the operating lever inclination angle becomes the value, controls the pump discharge flow rate, so a control valve passing flow rate is an actuator maximum flow rate when the differential pressure is constant; and when the operating lever inclination angle is between the value and the maximum, defines a maximum
(Continued)

pump discharge flow rate, so the pump discharge flow rate is kept to the actuator maximum flow rate.

10 Claims, 7 Drawing Sheets

(51) Int. Cl.

| | |
|---|---|
| ***E02F 9/20*** | (2006.01) |
| ***E02F 9/22*** | (2006.01) |
| ***F15B 11/10*** | (2006.01) |

(52) U.S. Cl.

CPC .......... *E02F 9/2285* (2013.01); *E02F 9/2296* (2013.01); *F15B 11/10* (2013.01); *F15B 11/165* (2013.01); *E02F 9/2225* (2013.01); *E02F 9/2267* (2013.01); *F15B 2211/20546* (2013.01); *F15B 2211/20553* (2013.01); *F15B 2211/253* (2013.01); *F15B 2211/30555* (2013.01); *F15B 2211/327* (2013.01); *F15B 2211/329* (2013.01); *F15B 2211/40515* (2013.01); *F15B 2211/426* (2013.01); *F15B 2211/465* (2013.01); *F15B 2211/575* (2013.01); *F15B 2211/6313* (2013.01); *F15B 2211/6346* (2013.01); *F15B 2211/6355* (2013.01); *F15B 2211/6654* (2013.01); *F15B 2211/67* (2013.01); *F15B 2211/7053* (2013.01); *F15B 2211/71* (2013.01); *F15B 2211/88* (2013.01)

(58) Field of Classification Search

USPC .......................................... 60/422, 445, 452

See application file for complete search history.

(56) References Cited

U.S. PATENT DOCUMENTS

| | | | | |
|---|---|---|---|---|
| 5,421,155 | A * | 6/1995 | Hirata .................. | F15B 11/165 60/452 |
| 5,630,317 | A * | 5/1997 | Takamura ............ | F15B 21/087 60/445 |
| 6,173,573 | B1 * | 1/2001 | Kamada ............... | F15B 11/166 60/422 |
| 7,458,211 | B2 * | 12/2008 | Koo ...................... | F15B 11/165 60/422 |
| 7,874,151 | B2 * | 1/2011 | Lin ....................... | F15B 21/082 60/422 |

* cited by examiner

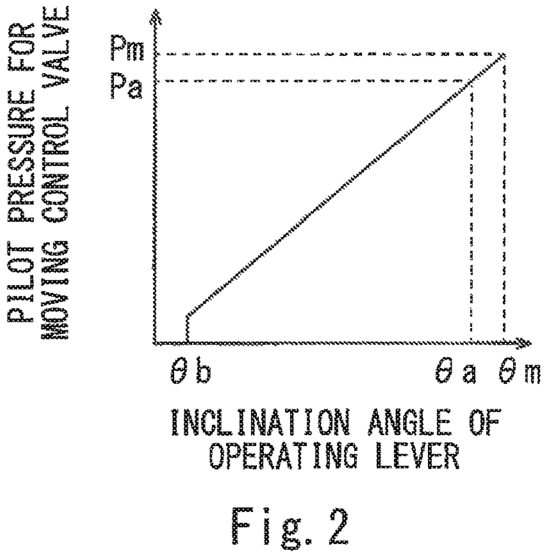
Fig. 2
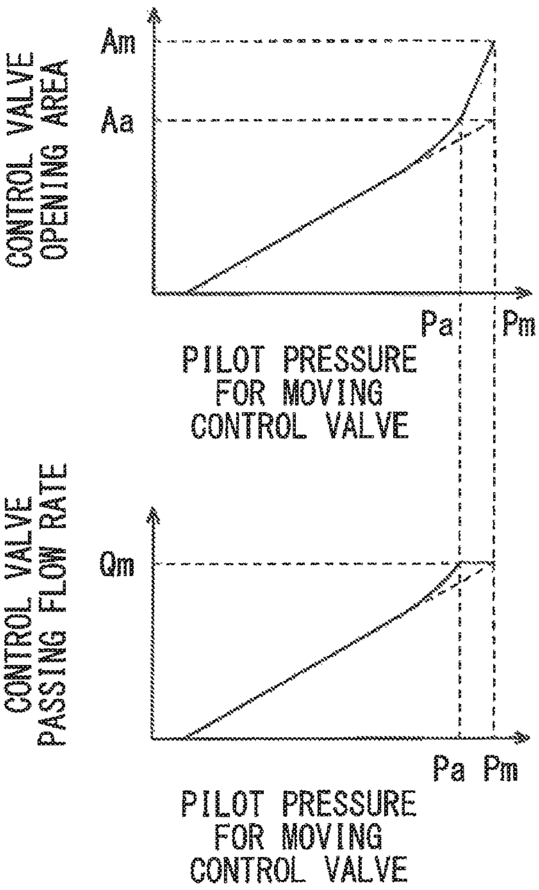
Fig. 3A
Fig. 3B

HYDRAULIC DRIVE SYSTEM

TECHNICAL FIELD

The present invention relates to a load-sensing hydraulic drive system.

BACKGROUND ART

Among industrial machines and construction machines, there are machines in Which a hydraulic drive system including a variable displacement pump is installed. For example, Patent Literature 1 discloses a load-sensing hydraulic drive system.

Specifically, the hydraulic drive system includes: a variable displacement pump; a control valve that controls supply and discharge of a hydraulic oil to and from an actuator; and an operating device including an operating lever, the operating device moving the control valve. The discharge flow rate of the pump is controlled by a flow regulator, such that the differential pressure between the discharge pressure of the pump and the load pressure of the actuator is constant.

CITATION LIST

Patent Literature

PTL 1: Japanese Laid-Open Patent Application Publication No. 2010-196780

SUMMARY OF INVENTION

Technical Problem

In the load-sensing hydraulic drive system, regardless of the operating amount of the operating device, the differential pressure between the discharge pressure of the pump and the load pressure of the actuator is always kept constant. Accordingly, particularly when the operating device receives a full lever operation (i.e., when the inclination angle of the operating lever is between the maximum value and a predetermined value approximating the maximum value), energy corresponding to the differential pressure between the discharge pressure of the pump and the load pressure of the actuator is consumed wastefully.

In view of the above, an object of the present invention is to provide a hydraulic drive system capable of suppressing energy consumption when an operating device receives a full lever operation in a load-sensing system.

Solution to Problem

In order to solve the above-described problems, a hydraulic drive system according to one aspect of the present invention includes: a control valve device including a control valve that controls supply and discharge of a hydraulic oil to and from an actuator; an operating device including an operating lever, the operating device moving the control valve device; a variable displacement pump connected to the control valve by a supply line; and a flow regulator that controls a discharge flow rate of the pump. The control valve device is configured such that when an inclination angle of the operating lever becomes a predetermined value approximating a maximum value, an opening area of the control valve becomes a reference opening area, and when the inclination angle of the operating lever increases from the predetermined value to the maximum value, the opening area increases from the reference opening area to a maximum opening area. The flow regulator: until the inclination angle of the operating lever becomes the predetermined value, increases the discharge flow rate of the pump in accordance with the inclination angle of the operating lever, such that a differential pressure between a discharge pressure of the pump and a load pressure of the actuator is constant; when the inclination angle of the operating lever becomes the predetermined value, controls the discharge flow rate of the pump, such that a passing flow rate of the control valve is an actuator maximum flow rate in a case where the differential pressure is constant; and when the inclination angle of the operating lever is between the predetermined value and the maximum value, defines a maximum discharge flow rate of the pump, such that the discharge flow rate of the pump is kept to the actuator maximum flow rate.

The "predetermined value approximating a maximum value" herein means 90 to 99% of the maximum value. The "actuator maximum flow rate" herein means a flow rate supplied to the actuator when the actuator moves at its maximum speed, which is determined by the specifications of a machine in which the above-described hydraulic drive system is installed.

According to the above configuration, when the inclination angle of the operating lever is between zero and the predetermined value, i.e., when the operating device receives a partial lever operation, the differential pressure between the discharge pressure of the pump and the load pressure of the actuator is always kept constant. Thus, normal load-sensing is performed. On the other hand, when the inclination angle of the operating lever is between the predetermined value and the maximum value, i.e., when the operating device receives a full lever operation, the opening area of the control valve increases although the discharge flow rate of the pump is kept to the actuator maximum flow rate. Accordingly, the differential pressure between the discharge pressure of the pump and the load pressure of the actuator decreases in accordance with increase in the inclination angle of the operating lever from the predetermined value. This makes it possible to suppress energy consumption when the operating device receives a full lever operation.

The flow regulator may include: a differential pressure regulating valve that reduces the discharge pressure of the pump based on the differential pressure between the discharge pressure of the pump and the load pressure of the actuator and outputs a control pressure; a servo piston having a smaller-diameter end portion and a larger-diameter end portion, the smaller-diameter end portion being exposed in a first pressure receiving chamber, into which the discharge pressure of the pump is introduced, the larger-diameter end portion being exposed in a second pressure receiving chamber, into which the control pressure outputted from the differential pressure regulating valve is introduced; and a stopper that defines the maximum discharge flow rate and that comes into contact with the larger-diameter end portion of the servo piston. According to this configuration, the advantageous effect that energy consumption is suppressed can be obtained without using electrical components.

The above hydraulic drive system may further include: a solenoid proportional valve that outputs a secondary pressure to the flow regulator; and a controller that controls the solenoid proportional valve. The flow regulator may be configured to change the maximum discharge flow rate in accordance with the secondary pressure outputted from the solenoid proportional valve. While the operating device is being operated, the controller may feed a command current to the solenoid proportional valve, such that the maximum discharge flow rate is equal to the actuator maximum flow rate. According to this configuration, even when the rotation speed of an engine varies, by controlling the maximum discharge capacity of the pump (maximum discharge capacity per rotation) in accordance with each rotation speed of the engine by the solenoid proportional valve, the maximum discharge flow rate of the pump can he controlled to be a certain constant value. This makes it possible to obtain an advantageous effect that energy consumption is suppressed at various rotation speeds of the engine.

A hydraulic drive system according to a second aspect of the present invention includes: a first control valve device including a first control valve that controls supply and discharge of a hydraulic oil to and from a first actuator; a second control valve device including a second control valve that controls supply and discharge of the hydraulic oil to and from a second actuator; a first operating device including an operating lever, the first operating device moving the first control valve device; a second operating device including an operating lever, the second operating device moving the second control valve device; a variable displacement pump connected to the first control valve and the second control valve by a supply line; a flow regulator that controls a discharge flow rate of the pump; a solenoid proportional valve that outputs a secondary pressure to the flow regulator; and a controller that controls the solenoid proportional valve. Each of the first control valve device and the second control valve device includes solenoid units each being configured to change a pilot pressure intended for moving the control valve in accordance with an electrical signal fed from the controller, and each control valve device is configured such that, in a case where the corresponding operating device is operated singly, when an inclination angle of the operating lever of the operating device becomes a predetermined value approximating a maximum value, an opening area of the control valve of the control valve device becomes a reference opening area, and when the inclination angle of the operating lever increases from the predetermined value to the maximum value, the opening area increases from the reference opening area to a maximum opening area. Each of the first operating device and the second operating device is an electrical joystick that outputs an electrical signal whose magnitude corresponds to the inclination angle of the operating lever to the controller. The flow regulator: until the inclination angle of the operating lever of one of the first operating device and the second operating device, the one operating device corresponding to an actuator with a load higher than that of the other actuator, becomes the predetermined value, increases the discharge flow rate of the pump in accordance with the inclination angle of the operating lever, such that a differential pressure between a discharge pressure of the pump and a load pressure of the actuator corresponding to the one operating device is constant; and when the inclination angle of the operating lever of the one operating device becomes the predetermined value, controls the discharge flow rate of the pump, such that a passing flow rate of the corresponding control valve is an actuator maximum flow rate in a case where the differential pressure is constant. The controller: when the inclination angle of the operating lever of the first operating device is between the predetermined value and the maximum value and the inclination angle of the operating lever of the second operating device is between zero and the predetermined value, feeds an electrical signal to one of the solenoid units of the first control valve device, the electrical signal causing the opening area of the first control valve to be the reference opening area, and feeds an electrical signal corresponding to the inclination angle of the operating lever of the second operating device to one of the solenoid units of the second control valve device; and when the inclination angle of the operating lever of the second operating device is between the predetermined value and the maximum value and the inclination angle of the operating lever of the first operating device is between zero and the predetermined value, feeds an electrical signal to one of the solenoid units of the second control valve device, the electrical signal causing the opening area of the second control valve device to be the reference opening area, and feeds an electrical signal corresponding to the inclination angle of the operating lever ofthe first operating device to one of the solenoid units of the first control valve device.

According to the above configuration, when one of the first operating device and the second operating device receives a full lever operation and the other operating device receives a partial lever operation, the opening area of the control valve of the control valve device corresponding to the operating device receiving the full lever operation is kept to the reference opening area. For this reason, the advantageous effect that energy consumption is suppressed is not obtained. However, the speed of the actuator and its precision in response to the lever operating amount of the operating device receiving the partial lever operation are the same as in normal cases.

A hydraulic drive system according to a third aspect of the present invention includes: a first control valve device including a first control valve that controls supply and discharge of a hydraulic oil to and from a first actuator; a second control valve device including a second control valve that controls supply and discharge of the hydraulic oil to and from a second actuator; a first operating device including an operating lever, the first operating device moving the first control valve device; a second operating device including an operating lever, the second operating device moving the second control valve device; a variable displacement pump connected to the first control valve and the second control valve by a supply line; a flow regulator that controls a discharge flow rate of the pump; a solenoid proportional valve that outputs a secondary pressure to the flow regulator; and a controller that controls the solenoid proportional valve. Each of the first control valve device and the second control valve device includes solenoid units each being configured to change a pilot pressure intended for moving the control valve in accordance with an electrical signal fed from the controller, and each control valve device is configured such that, in a case where the corresponding operating device is operated singly, when an inclination angle of the operating lever of the operating device becomes a predetermined value approximating a maximum value, an opening area of the control valve of the control valve device becomes a reference opening area, and when the inclination angle of the operating lever increases from the predetermined value to the maximum value, the opening area increases from the reference opening area to a maximum opening area. Each of the device operating device and the second operating device is an electrical joystick that outputs an electrical signal whose magnitude corresponds to the inclination angle of the operating lever to the controller. The flow regulator: until the inclination angle of the operating lever of one of the first operating device and the second operating device, the one operating device corresponding to an actuator with a load higher than that of the other actuator, becomes the predetermined value, increases the discharge flow rate of the pump in accordance with the inclination angle of the operating lever, such that a differential pressure between a discharge pressure of the pump and a load pressure of the actuator corresponding to the one operating device is constant; and when the inclination angle of the operating lever of the one operating device becomes the predetermined value, controls the discharge flow rate of the pump, such that a passing flow rate of the corresponding control valve is an actuator maximum flow rate in a case where the differential pressure is constant. The controller: when the inclination angle of the operating lever of the first operating device is between the predetermined value and the maximum value and the inclination angle of the operating lever of the second operating device is between zero and the predetermined value, feeds an electrical signal corresponding to the inclination angle of the operating lever of the first operating device to one of the solenoid units of the first control valve device, and feeds an electrical signal that has been corrected in accordance with the inclination angle of the operating lever of the second operating device to one of the solenoid units of the second control valve device; and when the inclination angle of the operating lever of the second operating device is between the predetermined value and the maximum value and the inclination angle of the operating lever of the first operating device is between zero and the predetermined value, feeds an electrical signal corresponding to the inclination angle of the operating lever of the second operating device to one of the solenoid units of the second control valve device, and feeds an electrical signal that has been corrected in accordance with the inclination angle of the operating lever of the first operating device to one of the solenoid units of the first control valve device.

According to the above configuration, when one of the first operating device and the second operating device receives a full lever operation and the other operating device receives a partial lever operation, the advantageous effect that energy consumption is suppressed is obtained owing to the control valve of the control valve device corresponding to the operating device receiving the full lever operation, and also, the speed of the actuator in response to the lever operating amount of the operating device receiving the partial lever operation is the same as in normal cases.

In each of the hydraulic drive system according to the above second aspect and the hydraulic drive system according to the above third aspect, the "first actuator maximum flow rate" means a flow rate supplied to the first actuator when the first actuator moves at its maximum speed, Which is determined by the specifications of a machine in which the above-described hydraulic drive system is installed, and the "second actuator maximum flow rate" means a flow rate supplied to the second actuator when the second actuator moves at its maximum speed, which is determined by the specifications of the machine in which the above-described hydraulic drive system is installed.

The hydraulic drive system according to the above first aspect may further include: a pressure compensation line that leads the hydraulic oil flowing from the supply line and passing through the control valve to one of a pair of supply/discharge lines intended for the actuator via the control valve; and a pressure compensation valve provided on the pressure compensation line. According to this configuration, pressure compensation is realized at the downstream side of a throttle of the control valve.

The hydraulic drive system according to the above second or third aspect may further include: pressure compensation lines, each of which leads the hydraulic oil flowing from the supply line and passing through the first or second control valve to one of a pair of supply/discharge lines intended for a corresponding one of the actuators via the control valve; and pressure compensation valves provided on the respective pressure compensation lines. According to this configuration, pressure compensation is realized at the downstream side of a throttle of the control valve.

Advantageous Effects of Invention

The present invention makes it possible to suppress energy consumption when an operating device receives a full lever operation in a load-sensing system.

BRIEF DESCRIPTION OF DRAWINGS

FIG. 2 is a graph showing a relationship between an inclination angle of an operating lever and a pilot pressure intended for moving a control valve.

FIG. 3A is a graph showing a relationship between the pilot pressure intended for moving the control valve and the opening area of the control valve.

FIG. 3B is a graph showing a relationship between the pilot pressure intended for moving the control valve and the passing flow rate of the control valve.

DESCRIPTION OF EMBODIMENTS (Embodiment 1)

Figure 1:
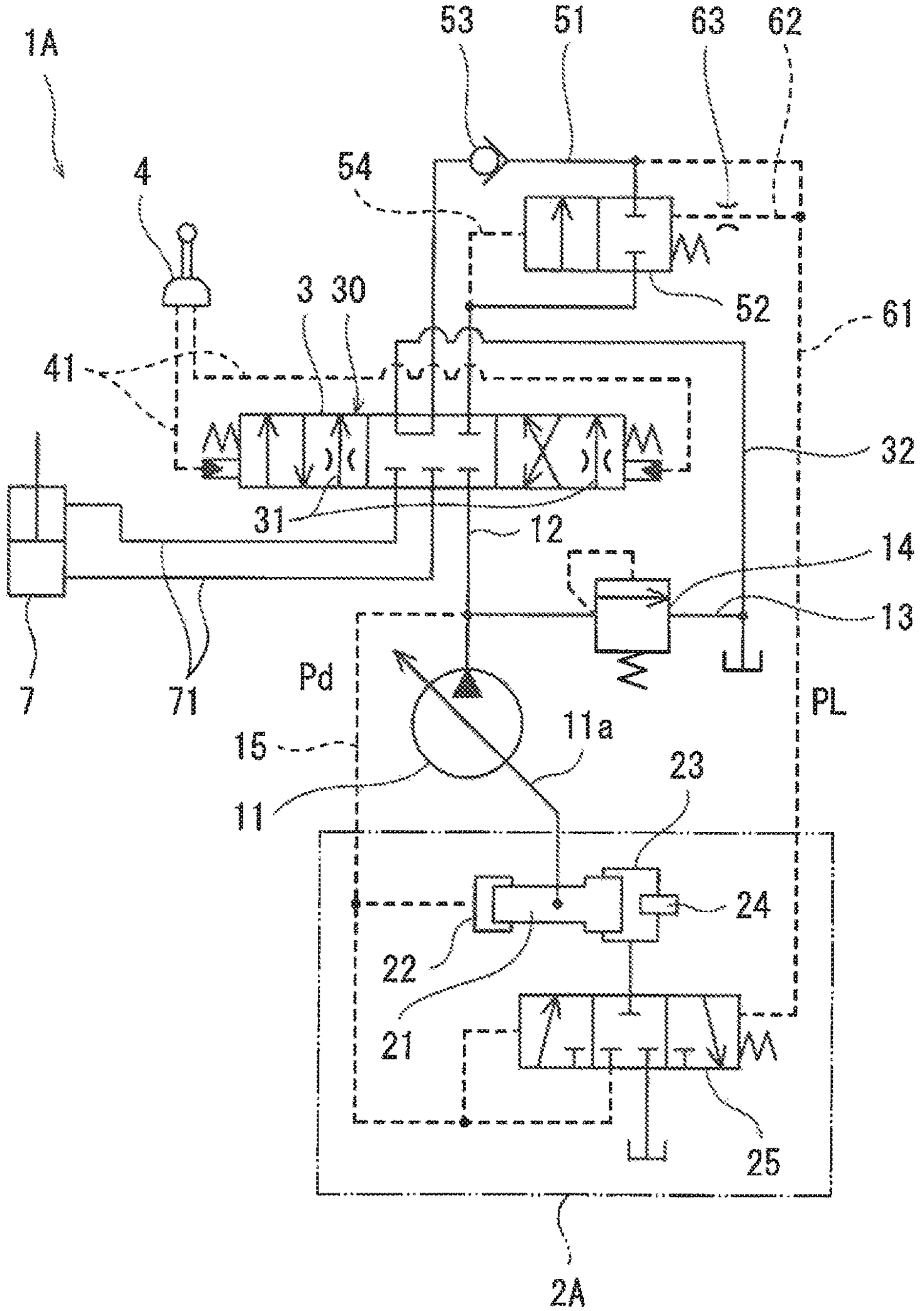
FIG. 1 shows a schematic configuration of a hydraulic drive system according to Embodiment 1 of the present invention.

FIG. 1 shows a hydraulic drive system 1A according to Embodiment 1 of the present invention. The hydraulic drive system 1A includes a variable displacement pump 11 and a control valve device 30 intended for an actuator 7.

The control valve device 30 includes a control valve 3, which is connected to the pump 11 by a supply line 12. The control valve 3 controls supply and discharge of a hydraulic oil to and from the actuator 7. The actuator 7 may be a hydraulic cylinder, or may be a hydraulic motor. The control valve 3 is connected to the actuator 7 by a pair of supply/discharge lines 71. Both ends of a pressure compensation line 51 are connected to the control valve 3. The pressure compensation line 51 is intended for leading the hydraulic oil that flows from the supply line 12 and passes through the control valve 3 to one of the pair of supply/discharge lines 71 via the control valve 3.

When the control valve 3 is in its neutral position, the control valve 3 blocks the supply line 12 and the pair of supply/discharge lines 71. When the control valve 3 moves, the supply line 12 comes into communication with the upstream end of the pressure compensation line 51, and the downstream end of the pressure compensation line 51 comes into communication with one of the pair of supply/discharge lines 71. A tank line 32 is also connected to the control valve 3. When the control valve 3 moves, the other supply/discharge line 71 comes into communication with the tank line 32. The opening area of a passage 31 in the control valve 3, the passage 31 being positioned between the supply line 12 and the upstream end of the pressure compensation line 51, functions as a throttle.

A relief line 13 branches off from the supply line 12. The relief line 3 is connected to a tank. The relief line 13 is provided with a relief valve 14.

The pressure compensation line 51 is provided with a pressure compensation valve 52. That is, pressure compensation is realized at the downstream side of the throttle (passage 31) of the control valve 3. The pressure compensation line 51 is further provided with a check valve 53 positioned downstream of the pressure compensation valve 52. When the control valve 3 is in its neutral position, the upstream end of the pressure compensation line 51 is blocked, and the downstream end of the pressure compensation line 51 is in communication with the tank line 32.

A load pressure detection line 61 branches off from the pressure compensation line 51 at a position between the pressure compensation valve 52 and the check valve 53. The load pressure detection line 61 is connected to a flow regulator 2A described below. A discharge pressure detection line 15, which branches off from the supply line 12, is also connected to the flow regulator 2A described below.

The pressure compensation valve 52 serves to keep constant the differential pressure between the upstream side and the downstream side of the throttle (passage 31) of the control valve 3. The pressure upstream of the pressure compensation valve 52 is led to the pressure compensation valve 52 through a first pilot line 54, and the pressure of the load pressure detection line 61 (load pressure PL of the actuator 7) is led to the pressure compensation valve 52 through a second pilot line 62. The second pilot line 62 positioned at the spring side is provided with a throttle 63.

The above-described control valve device 30 is moved by an operating device 4 including an operating lever. In the present embodiment, the operating device 4 is a pilot operation valve that outputs a pilot pressure whose magnitude corresponds to an inclination angle of the operating lever as shown in FIG. 2. That is, the operating device 4 is connected to pilot ports of the control valve 3 by a pair of pilot lines 41. It should be noted that the inclination angle range of the operating lever from zero to a first predetermined value θb is a dead zone. The operating device 4 outputs a sub-maximum pilot pressure Pa when the inclination angle of the operating lever becomes a second predetermined value θa approximating a maximum value θm, and outputs a maximum pilot pressure Pm when the inclination angle of the operating lever becomes the maximum value θm.

As shown in FIG. 3A, the control valve device 30 is configured such that when the sub-maximum pilot pressure Pa is outputted from the operating device 4, i.e., when the inclination angle of the operating lever of the operating device 4 becomes the second predetermined value θa, the opening area of the control valve 3 (the aforementioned opening area of the passage 31) becomes a reference opening area Aa. The control valve device 30 is further configured such that when the pilot pressure outputted from the operating device 4 increases from the sub-maximum pilot pressure Pa to the maximum pilot pressure Pm, i.e., when the inclination angle of the operating lever of the operating device 4 increases from the second predetermined value θa to the maximum value θm, the opening area of the control valve 3 increases from the reference opening area Aa to a maximum opening area Am. In FIG. 3A, a straight dashed line indicates the opening area of a general control valve, and from a point slightly lower than the sub-maximum pilot pressure Pa, the opening area of the control valve 3 of the present embodiment increases to a significantly greater degree than the opening area of the conventional control valve does.

In the present embodiment, the above-described pump 11 is a awash plate pump including a awash plate 11*a*. Alternatively, the pump 11 may be a bent axis pump. The discharge flow rate of the pump 11 is controlled by the flow regulator 2A based on the discharge pressure Pd of the pump 11 and the load pressure PL of the actuator 7.

The flow regulator 2A, until the inclination angle of the operating lever of the operating device 4 becomes the second predetermined value θa, increases the discharge flow rate of the pump 11 in accordance with the inclination angle of the operating lever, such that the differential pressure ΔP between the discharge pressure Pd of the pump 11, which is lead through the discharge pressure detection line 15, and the load pressure PL of the actuator 7, which is led through the load pressure detection line 61, is constant. It should be noted that the differential pressure ΔP being constant means that the differential pressure ΔP is substantially equal to its setting value. When the inclination angle of the operating lever of the operating device 4 becomes the second predetermined value θa, the flow regulator 2A controls the discharge flow rate of the pump 11, such that the passing flow rate of the control valve 3 is an actuator maximum flow rate Qm as shown in FIG. 3B in a case where the differential pressure ΔP is constant. In other words, the reference opening area Aa and the differential pressure ΔP are set such that when the inclination angle of the operating lever of the operating device 4 becomes the second predetermined value θa, the passing flow rate of the control valve 3 becomes the actuator maximum flow rate Qm. It should be noted that the "actuator maximum flow rate" herein means a flow rate supplied to the actuator 7 when the actuator 7 moves at its maximum speed, which is determined by the specifications of a machine in which the hydraulic drive system 1A is installed. The flow regulator 2A defines a maximum discharge flow rate Qpm of the pump 11, such that when the inclination angle of the operating lever of the operating device 4 is between the second predetermined value θa and the maximum value θm, the discharge flow rate of the pump 11 is kept to the actuator maximum flow rate Qm.

To be more specific, the flow regulator 2A includes: a servo piston 21 coupled to the swash plate 11*a* of the pump 11; and a differential pressure regulating valve 25. A first pressure receiving chamber 22 and a second pressure receiving chamber 23 are formed in the flow regulator 2A. The discharge pressure Pd of the pump 11 is introduced into the first pressure receiving chamber 22 through the discharge pressure detection line 15. A control pressure outputted from the differential pressure regulating valve 25 is introduced into the second pressure receiving chamber 23. The servo piston 21 has a smaller-diameter end portion exposed in the first pressure receiving chamber 22 and a larger-diameter end portion exposed in the second pressure receiving chamber 23.

The discharge pressure Pd of the pump 11 and the load pressure PL of the actuator 7 are applied as pilot pressures to the differential pressure regulating valve 25 from both sides. Then, based on the differential pressure ΔP between the discharge pressure Pd of the pump 11 and the load pressure PL of the actuator 7, the differential pressure regulating valve 25 reduces the discharge pressure Pd of the pump 11 and outputs a control pressure.

The flow regulator 2A further includes a stopper 24, which defines the aforementioned maximum discharge flow rate Qpm. The stopper 24 protrudes into the second pressure receiving chamber 23, and comes into contact with the larger-diameter end portion of the servo piston 21.

Figure 4:
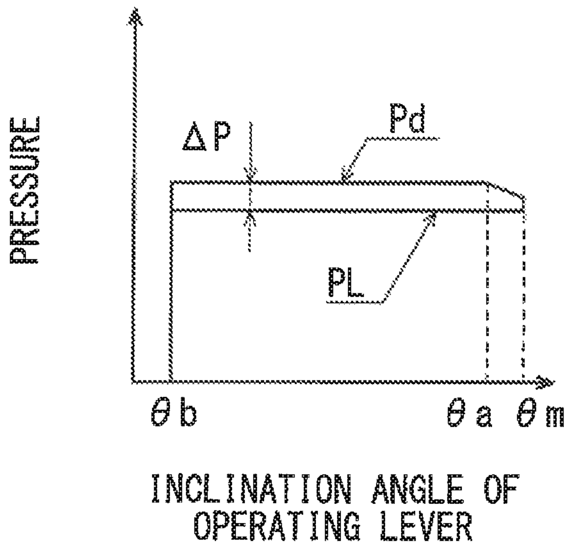
FIG. 4 is a graph showing a relationship of the inclination angle of the operating lever with a pump discharge pressure Pd and an actuator load pressure PL.

As described above, in the hydraulic drive system 1A according to the present embodiment, as shown in FIG. 4, when the inclination angle of the operating lever of the operating device 4 is between zero (or the first predetermined value θb) and the second predetermined value θa, i.e., when the operating device 4 receives a partial lever operation, the differential pressure ΔP between the discharge pressure Pd of the pump 11 and the load pressure PL of the actuator 7 is always kept constant. Thus, normal load-sensing is performed. On the other hand, when the inclination angle of the operating lever is between the second predetermined value θa and the maximum value θm, i.e., when the operating device 4 receives a full lever operation, the opening area of the control valve 3 increases although the maximum discharge flow rate Qpm of the pump 11 is limited and kept to the actuator maximum flow rate Qm. Accordingly, the differential pressure ΔP between the discharge pressure Pd of the pump 11 and the load pressure PL of the actuator 7 decreases in accordance with increase in the inclination angle of the operating lever from the second predetermined value θa. This makes it possible to suppress energy consumption when the operating device 4 receives a full lever operation.

(Embodiment 2)

Figure 5:
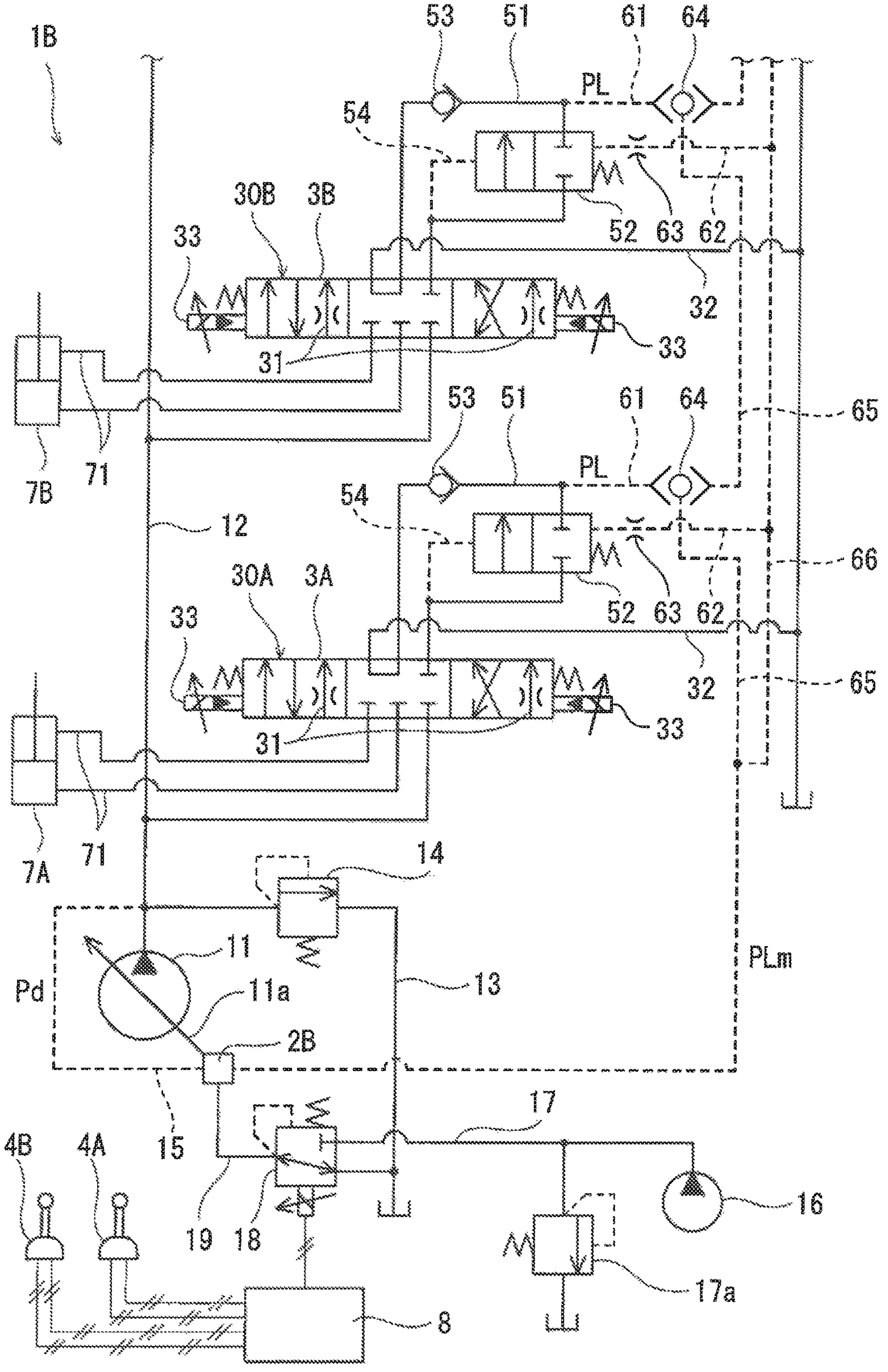
FIG. 5 shows a schematic configuration of a hydraulic drive system according to Embodiment 2 of the present invention.

Next, a hydraulic drive system 1B according to Embodiment 2 of the present invention is described with reference to FIG. 5 and FIG. 6. It should be noted that, in the present embodiment, the same components as those described in Embodiment 1 are denoted by the same reference signs as those used in Embodiment 1, and repeating the same descriptions is avoided below.

The hydraulic drive system 1B includes: two actuators (a first actuator 7A and a second actuator 7B); a first control valve device 30A intended for the first actuator 7A; and a second control valve device 30B intended for the second actuator 7B. However, as an alternative, the hydraulic drive system 1B may include three or more sets of actuators and control valve devices.

The first control valve device 30A includes a first control valve 3A, which is connected to the pump 11 by the supply line 12. The first control valve 3A controls supply and discharge of the hydraulic oil to and from the first actuator 7A. The second control valve device 30B includes a second control valve 3B, which is connected to the pump 11 by the supply line 12. That is, the second control valve 3B is connected to the pump 11 in parallel to the first control valve 3A. The second control valve 3B controls supply and discharge of the hydraulic oil to and from the second actuator 7B. Each of the first actuator 7A and the second actuator 7B may be a hydraulic cylinder, or may be a hydraulic motor.

Each of the first control valve device 30A and the second control valve device 30B is configured in the same manner as the control valve device 30 of Embodiment 1, except that each of the first control valve device 30A and the second control valve device 30B includes a pair of solenoid units 33. Each solenoid unit 33 changes a pilot pressure intended for moving a control valve (the first control valve 3A or the second control valve 3B) in accordance with an electrical signal fed from a controller 8. It should be noted that FIG. 5 shows only part of a control line for simplifying the drawing.

The first control valve device 30A is moved by a first operating device 4A including an operating lever, and the second control valve device 30B is moved by a second operating device 4B including an operating lever. Each of the first operating device 4A and the second operating device 4B is an electrical joystick that outputs, for each inclination direction of its operating lever, an electrical signal whose magnitude corresponds to an inclination angle of the operating lever to the controller 8.

Figure 7A:
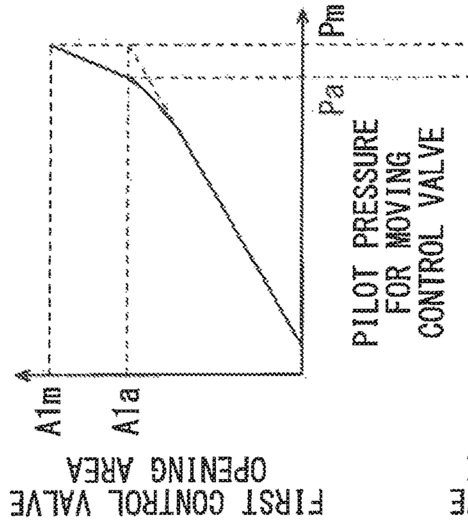
FIG. 7A is a graph showing a relationship between a pilot pressure intended for moving a first control valve and the opening area of the first control valve.

Each of the first control valve device 30A and the second control valve device 30B is described hereinafter in more detail. As shown in FIG. 7A, the first control valve device 30A is configured such that when the pilot pressure intended for moving the first control valve 3A becomes the sub-maximum pilot pressure Pa (e.g., when the inclination angle of the operating lever of the first operating device 4A becomes a predetermined value θc approximating the maximum value θm in a case where the first operating device 4A is operated singly as described below), the opening area of the first control valve 3A (the opening area of the passage 31) becomes a reference opening area A1*a*. The first control valve device 30A is further configured such that when the pilot pressure intended for moving the first control valve 3A increases from the sub-maximum pilot pressure Pa to the maximum pilot pressure Pm (e.g., when the inclination angle of the operating lever of the first operating device 4A increases from the predetermined value θc to the maximum value θm in the case where the first operating device 4A is operated singly), the opening area of the first control valve 3A increases from the reference opening area A1*a* to a maximum opening area A1*m*. In FIG. 7A, similar to FIG. 3A, a dashed line indicates the opening area of a general control valve.

Figure 7B:
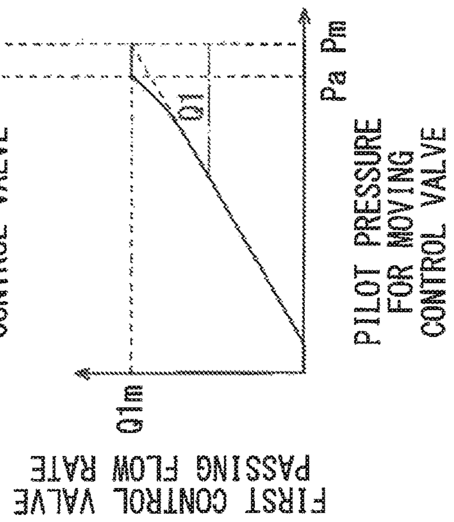
FIG. 7B is a graph showing a relationship between the pilot pressure intended for moving the first control valve and the passing flow rate of the first control valve.
Figure 7C:
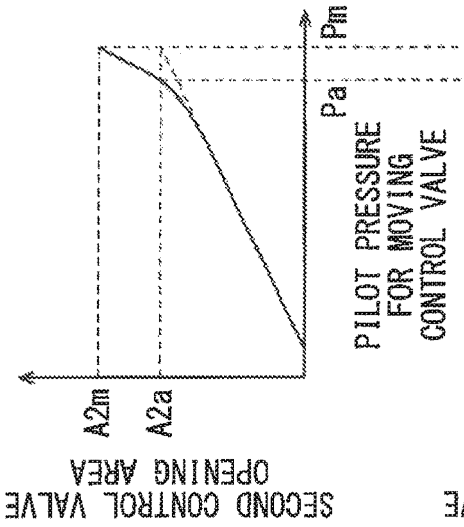
FIG. 7C is a graph showing a relationship between a pilot pressure intended for moving a second control valve and the opening area of the second control valve.

Similarly, as shown in FIG. 7C, the second control valve device 30B is configured such that when the pilot pressure intended for moving the second control valve 3B becomes the sub-maximum pilot pressure Pa (e.g., when the inclination angle of the operating lever of the second operating device 4B becomes the predetermined value θc approximating the maximum value θm in a case where the second operating device 4B is operated singly as described below), the opening area of the second control valve 3B (the opening area of the passage 31) becomes a reference opening area A2*a*. The second control valve device 30B is further configured such that when the pilot pressure intended for moving the second control valve 3B increases from the sub-maximum pilot pressure Pa to the maximum pilot pressure Pm (e.g., when the inclination angle of the operating lever of the second operating device 48 increases from the predetermined value θc to the maximum value θm in the case where the second operating device 4B is operated singly), the opening area of the second control valve 3B increases from the reference opening area A2*a* to a maximum opening area A2*m*. In FIG. 7C, similar to FIG. 3A, a dashed line indicates the opening area of a general control valve.

The hydraulic drive system 1B according to the present embodiment is configured to detect a maximum load pressure PLm, which is either the load pressure PL of the first actuator 7A or the load pressure PL of the second actuator 7B. Specifically, a high pressure selective valve 64 is connected to the distal end of each load pressure detection line 61. The adjacent high pressure selective valves 64 are connected to each other by high pressure selective lines 65, and a terminal one of the high pressure selective lines 65 is connected to a flow regulator 2B. A maximum load pressure line 66 branches off from the terminal high pressure selective line 65, and the second pilot line 62 of each pressure compensation valve 52 is connected to the maximum load pressure line 66. Each pressure compensation valve 52 serves to keep constant the differential pressure between the upstream side and the downstream side of the throttle (passage 31) of the control valve (3A or 3B).

The discharge pressure detection line 15 is also connected to the flow regulator 2B. The flow regulator 2B controls the discharge flow rate of the pump 11 based on the discharge pressure Pd of the pump 11 and the maximum load pressure PLm (the load pressure PL of the first actuator 7A or the load pressure PL of the second actuator 7B). The flow regulator 2B defines the maximum discharge flow rate Qpm of the pump 11.

Figure 7D:
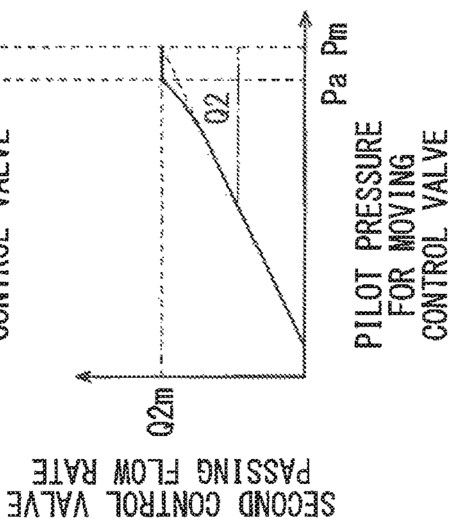
FIG. 7D is a graph showing a relationship between the pilot pressure intended for moving the second control valve and the passing flow rate of the second control valve.

Specifically, until the inclination angle of the operating lever of one of the first operating device 4A and the second operating device 4B, the one operating device corresponding to an actuator (the first actuator 7A or the second actuator 7B) with a load higher than that of the other actuator (the one operating device is hereinafter referred to as a "higher-load operating device"), becomes the predetermined value θc, the flow regulator 213 increases the discharge flow rate of the pump 11 in accordance with the inclination angle of the operating lever, such that the differential pressure ΔP between the discharge pressure Pd of the pump 11, which is led through the discharge pressure detection line 15, and the load pressure PL of the actuator corresponding to the higher-load operating device, which is led through the high pressure selective line 65, is constant. When the inclination angle of the operating lever of the higher-load operating device becomes the predetermined value θc, the flow regulator 2B controls the discharge flow rate of the pump 11, such that the passing flow rate of the corresponding control valve is the actuator maximum flow rate (in the case of the first control valve 3A, a first actuator maximum flow rate Q1*m*; in the case of the second control valve 3B, a second actuator maximum flow rate Q2*m*) as shown in FIGS. 7B and 7D in a case where the differential pressure ΔP is constant. In other words, the reference opening area (in the case of the first control valve 3A, the reference opening area A1*a*; in the case of the second control valve 3B, the reference opening area A2*a*) and the differential pressure ΔP are set such that when the inclination angle of the operating lever of the higher-load operating device becomes the predetermined value θc, the passing flow rate of the control valve becomes the actuator maximum flow rate (in the case of the first control valve 3A, the first actuator maximum flow rate Q1*m*; in the case of the second control valve 3B, the second actuator maximum flow rate Q2*m*).

In the present embodiment, the first actuator maximum flow rate Q1*m* is higher than the second actuator maximum flow rate Q2*m*. That is, the maximum speed of the first actuator 7A is higher than the maximum speed of the second actuator 7B, or the volume of the actuating chamber of the first actuator 7A is greater than the volume of the actuating chamber of the second actuator 7B. For example, assuming that the rotation speed of an engine driving the pump 11 is constant at 2000 rpm (the same applies hereinafter), Q1*m* is 120 L/min and Q2*m* is 100 L/min. It should be noted that, alternatively, Q1*m* may be equal to Q2*m*, or Q2*m* may be higher than Q1*m*.

The flow regulator 2B is connected to a solenoid proportional valve 18 by a secondary pressure line 19. The solenoid proportional valve 18 is connected to an auxiliary pump 16 by a primary pressure line 17. The pressure of the primary pressure line 17 is kept constant by a relief valve 17*a*.

The solenoid proportional valve 18 is controlled by the controller 8, and outputs a secondary pressure to the flow regulator 2B. The flow regulator 2B is configured to change the aforementioned maximum discharge flow rate Qpm in accordance with the secondary pressure outputted from the solenoid proportional valve 18.

Figure 6:
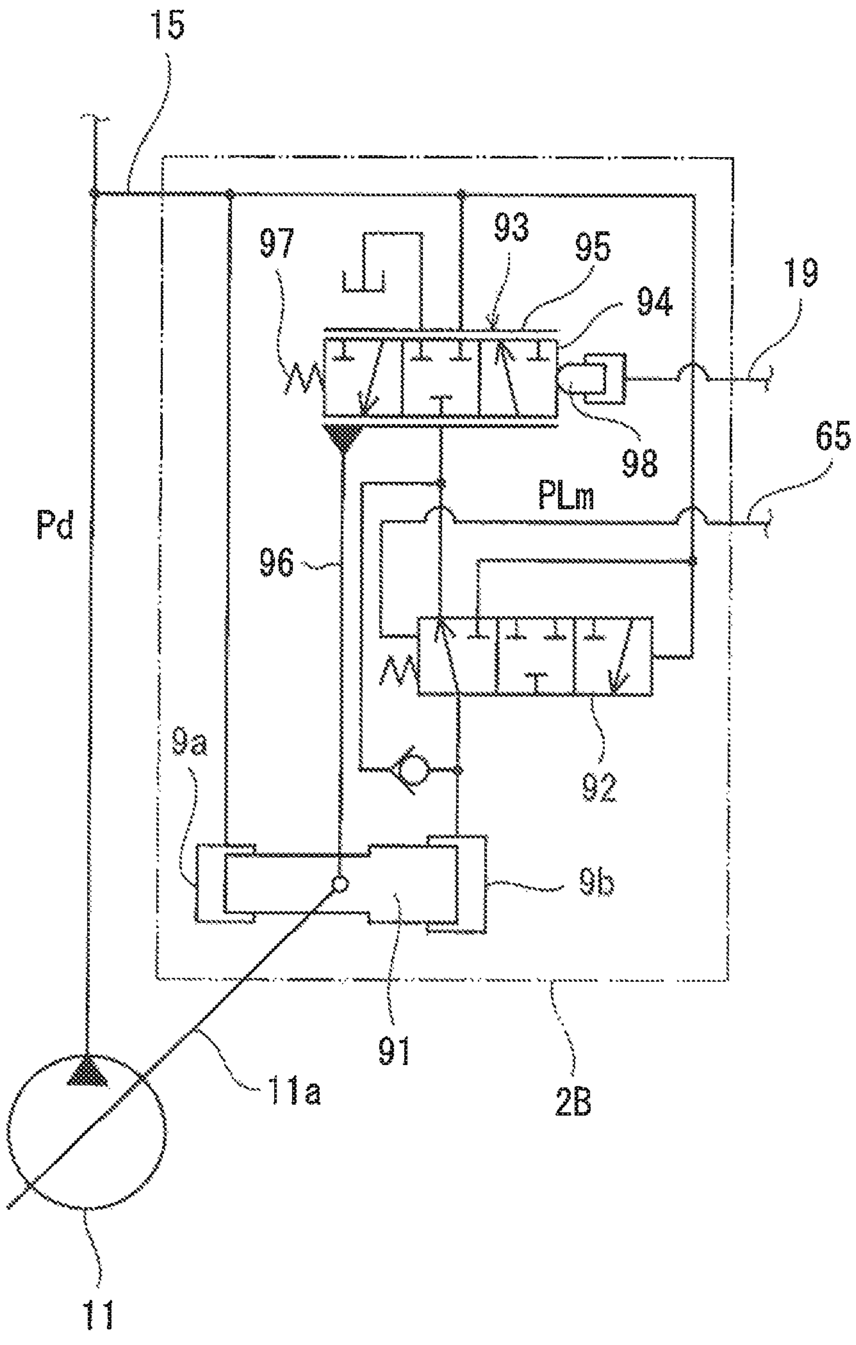
FIG. 6 shows a schematic configuration of a flow regulator in Embodiment 2.

To be more specific, as shown in FIG. 6, the flow regulator 2B includes a servo piston 91, a differential pressure regulating valve 92, and a flow regulating valve 93. A first pressure receiving chamber 9*a*, in which a smaller-diameter end portion of the servo piston 91 is exposed, and a second pressure receiving chamber 9*b*, in which a larger-diameter end portion of the servo piston 91 is exposed, are formed in the flow regulator 2B. The discharge pressure Pd of the pump 11 is introduced into the first pressure receiving chamber 9*a*, and the second pressure receiving chamber 9*b* is connected to the flow regulating valve 93 via the differential pressure regulating valve 92.

The servo piston 91 shifts in the axial direction of the servo piston 91 in conjunction with the swash plate 11*a* of the pump 11. The flow regulating valve 93 includes: a sleeve 95, which is coupled to the servo piston 91 and which shifts in the axial direction of the servo piston 91 in conjunction with the servo piston 91; and a spool 94, which slides relative to the sleeve 95. The spool 94 is urged by a spring 97 in such a direction as to decrease the discharge flow rate of the pump 11, and pushed by a piston 98 in such a direction as to increase the discharge flow rate of the pump 11. The secondary pressure of the solenoid proportional valve 18, which is led through the secondary pressure line 19, is applied to the piston 98. The differential pressure regulating valve 92 moves in accordance with the differential pressure ΔP between the discharge pressure Pd of the pump 11 and the maximum load pressure PLm led though the high pressure selective line 65.

The flow regulating valve 93 outputs a control pressure corresponding to the secondary pressure of the solenoid proportional valve 18, and the differential pressure regulating valve 92 outputs a control pressure corresponding to the differential pressure ΔP between the discharge pressure Pd of the pump 11 and the maximum load pressure PLm.

Between the control pressure from the flow regulating valve 93 and the control pressure from the differential pressure regulating valve 92, the higher one (i.e., one that decreases the discharge flow rate of the pump 11 to a greater degree) is introduced into the second pressure receiving chamber 9*b*.

In the present embodiment, the control of the first control valve 3A, the second control valve 3B, and the solenoid proportional valve 18 varies between a case where either the first operating device 4A or the second operating device 4B is operated singly and a case where both the first operating device 4A and the second operating device 4B are operated concurrently. Therefore, a description of a single operation and a description of a concurrent operation are given below separately.

<Single Operation>

In a case where the first operating device 4A is operated singly, regardless of whether the inclination angle of the operating lever is between zero and the predetermined value θc (i.e., the first operating device 4A receives a partial lever operation) or the inclination angle of the operating lever is between the predetermined value θc and the maximum value θm (i.e., the first operating device 4A receives a full lever operation), the controller 8 feeds an electrical signal corresponding to the inclination angle of the operating lever to one of the solenoid units 33 of the first control valve device 30A. Accordingly, the relationship between the inclination angle of the operating lever of the first operating device 4A and the pilot pressure intended for moving the first control valve 3A is as shown in FIG. 2. Therefore, when the inclination angle of the operating lever of the first operating device 4A becomes the predetermined value θc (the second predetermined value θa in FIG. 2), the opening area of the first control valve 3A becomes the reference opening area A1*a*, and when the inclination angle of the operating lever becomes the maximum value θm, the opening area of the first control valve 3A becomes the maximum opening area A1*m*.

While the first operating device 4A is being operated, the controller 8 feeds a command current to the solenoid proportional valve 18, such that the maximum discharge flow rate Qpm defined by the flow regulating valve 93 of the flow regulator 2B is equal to the first actuator maximum flow rate Q1*m*. Accordingly, at least when the inclination angle of the operating lever is between zero and the predetermined value θc (i.e., at least when the first operating device 4A receives a partial lever operation), the maximum discharge flow rate Qpm of the pump 11 is limited and kept to the first actuator maximum flow rate Q1*m*.

As a result, as shown in FIG. 4, when the first operating device 4A receives a partial lever operation, the differential pressure ΔP between the discharge pressure Pd of the pump 11 and the load pressure PL of the first actuator 7A is always kept constant. Thus, normal load-sensing is performed. On the other hand, when the first operating device 4A receives a full lever operation, the opening area of the first control valve 3A increases although the discharge flow rate of the pump 11 is kept to the first actuator maximum flow rate Q1*m*. Accordingly, the differential pressure ΔP between the discharge pressure Pd of the pump 11 and the load pressure PL of the first actuator 7A decreases in accordance with increase in the inclination angle of the operating lever from the predetermined value θc. This makes it possible to suppress energy consumption when the first operating device 4A receives a full lever operation.

Control similar to that performed in the case where the first operating device 4A is operated singly is performed also in a case where the second operating device 4B is operated singly. That is, the relationship between the inclination angle of the operating lever of the second operating device 4B and the pilot pressure intended for moving the second control valve 3B is as shown in FIG. 2. Also, while the second operating device 4B is being operated, the controller 8 feeds a command current to the solenoid proportional valve 18, such that the maximum discharge flow rate Qpm defined by the flow regulating valve 93 of the flow regulator 2B is equal to the second actuator maximum flow rate Q2*m*. Accordingly, at least when the inclination angle of the operating lever is between zero and the predetermined value θc (i.e., at least when the second operating device 4B receives a partial lever operation), the maximum discharge flow rate Qpm of the pump 11 is limited and kept to the second actuator maximum flow rate Q2*m*.

As a result, as shown in FIG. 4, when the second operating device 4B receives a partial lever operation, the differential pressure ΔP between the discharge pressure Pd of the pump 11 and the load pressure PL of the second actuator 7B is always kept constant. Thus, normal load-sensing is performed. On the other hand, when the second operating device 41B receives a full lever operation, the opening area of the second control valve 3B increases although the discharge flow rate of the pump 11 is kept to the second actuator maximum flow rate Q2*m*. Accordingly, the differential pressure ΔP between the discharge pressure Pd of the pump 11 and the load pressure PL of the second actuator 7B decreases in accordance with increase in the inclination angle of the operating lever from the predetermined value θc. This makes it possible to suppress energy consumption when the second operating device 4B receives a full lever operation.

<Concurrent Operation (Regarding the Maximum Discharge Flow Rate)>

While the first operating device 4A and the second operating device 4B are being operated concurrently, the controller 8 feeds a command current to the solenoid proportional valve 18, such that the maximum discharge flow rate Qpm defined by the flow regulating valve 93 of the flow regulator 2B is higher than the first actuator maximum flow rate Q1*m* and the second actuator maximum flow rate Q2*m*. For example, in a case where the first actuator maximum flow rate Q1*m* and the second actuator maximum flow rate Q2*m* are both in the range of 100 to 120 L/min, the maximum discharge flow rate Qpm is 140 L/min.

<Concurrent Operation (Double Hill Lever Operation)>

When both the first operating device 4A and the second operating device 4B receive a full lever operation, the controller 8 feeds an electrical signal corresponding to the inclination angle of the operating lever of the first operating device 4A to one of the solenoid units 33 of the first control valve device 30A, and also feeds an electrical signal corresponding to the inclination angle of the operating lever of the second operating device 4B to one of the solenoid units 33 of the second control valve device 30B. Accordingly, the relationship between the inclination angle of the operating lever of the first operating device 4A and the pilot pressure intended for moving the first control valve 3A and the relationship between the inclination angle of the operating lever of the second operating device 4B and the pilot pressure intended for moving the second control valve 3B are as shown in FIG. 2. Accordingly, when the inclination angle of the operating lever of the first operating device 4A becomes the predetermined value θc, the opening area of the first control valve 3A becomes the reference opening area A1*a*, and when the inclination angle of the operating lever becomes the maximum value θm, the opening area of the first control valve 3A becomes the maximum opening area A1*m*. Similarly, when the inclination angle of the operating lever of the second operating device 4B becomes the predetermined value θc, the opening area of the second control valve 3B becomes the reference opening area A2*a*, and when the inclination angle of the operating lever becomes the maximum value θm, the opening area of the second control valve 3B becomes the maximum opening area A2*m*. Therefore, energy consumption can be suppressed when the inclination angle of the operating lever of the first operating device 4A and the inclination angle of the operating lever of the second operating device 4B are between the predetermined value θc and the maximum value θm (i.e., when both the first operating device 4A and the second operating device 4B receive a full lever operation).

It should be noted that, in this case, the passing flow rate of the first control valve 3A and the passing flow rate of the second control valve 3B increase in accordance with the inclination angles of the operating levers until the inclination angles of the operating levers reach specific values, but thereafter, the passing flow rate of the first control valve 3A and the passing flow rate of the second control valve 3B are kept to values (Q1 in FIG. 7B and Q2 in FIG. 7D), the sum of which is the maximum discharge flow rate Qpm.

<Concurrent Operation (Full Lever Operation and Partial Lever Operation)>

Figure 8:
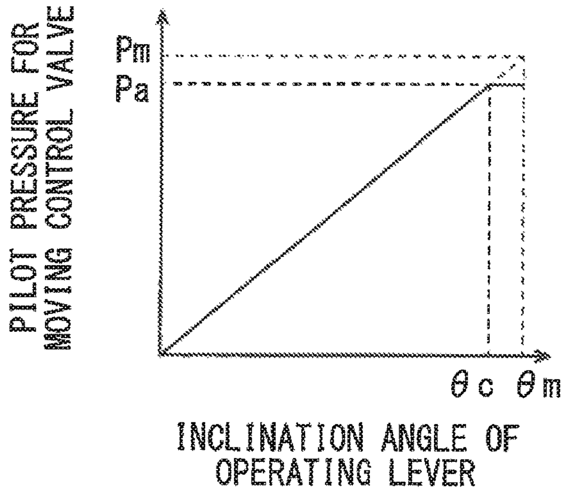
FIG. 8 is a graph relating to a case where one of a first operating device and a second operating device receives a full lever operation and the other operating device receives a partial lever operation in Embodiment 2, the graph showing a relationship between an inclination angle of an operating lever of the operating device receiving the full lever operation and a pilot pressure intended for moving a control valve corresponding to the operating device.

When the first operating device 4A receives a full lever operation and the second operating device 4B receives a partial lever operation, the controller 8 feeds an electrical signal to one of the solenoid units 33 of the first control valve device 30A, the electrical signal causing the opening area of the first control valve 3A to be the reference opening area A1*a* as shown in FIG. 7A and FIG. 8, and also, feeds an electrical signal corresponding to the inclination angle of the operating lever of the second operating device 4B as shown in FIG. 2 to one of the solenoid units 33 of the second control valve device 30B.

Similarly, when the second operating device 4B receives a full lever operation and the first operating device 4A receives a partial lever operation, the controller 8 feeds an electrical signal to one of the solenoid units 33 of the second control valve device 30B, the electrical signal causing the opening area of the second control valve 3B to be the reference opening area A2*a* as shown in FIG. 7C and FIG. 8, and also, feeds an electrical signal corresponding to the inclination angle of the operating lever of the first operating device 4A as shown in FIG. 2 to one of the solenoid units 33 of the first control valve device 30A.

According to the above control, when one of the first operating device 4A and the second operating device 4B receives a full lever operation and the other operating device receives a partial lever operation, the opening area of the control valve (3A or 3B) of the control valve device (30A or 30B) corresponding to the operating device receiving the full lever operation is kept to the reference opening area (A1*a* or A2*a*). For this reason, the advantageous effect that energy consumption is suppressed is not obtained. However, the speed of the actuator and its precision in response to the lever operating amount of the operating device receiving the partial lever operation are the same as in normal cases.

<Variations>

Figure 9:
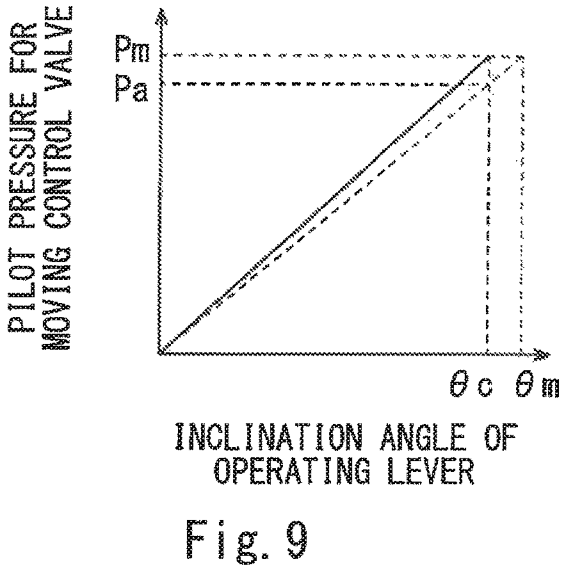
FIG. 9 is a graph relating to a case where one of the first operating device and the second operating device receives a full lever operation and the other operating device receives a partial lever operation in one variation of Embodiment 2, the graph showing a relationship between the inclination angle of the operating lever of the operating device receiving the partial lever operation and a pilot pressure intended for moving a control valve corresponding to the operating device.

When the first operating device 4A receives a full lever operation and the second operating device 4B receives a partial lever operation, the controller 8 may feed an electrical signal corresponding to the inclination angle of the operating lever of the first operating device 4A as shown in FIG. 2 to one of the solenoid units 33 of the first control valve device 30A, and feed an electrical signal that has been corrected in accordance with the inclination angle of the operating lever of the second operating device 4B so as to increase as shown in FIG. 9 to one of the solenoid units 33 of the second control valve device 30B. For example, the electrical signal that has been corrected in accordance with the inclination angle of the operating lever is an electrical signal corresponding to a value that results from multiplying the inclination angle of the operating lever by a coefficient of 1.03 to 1.5. In this case, the coefficient is a value defined as A1*m*/A1*a*, which is the ratio of the maximum opening area A1*m* to the reference opening area. A1*a*. The controller 8 feeds a predetermined command current to the solenoid proportional valve 18 with each passing moment, such that the maximum discharge flow rate Qpm of the pump 11 is a total flow rate that is calculated from the inclination angles of the respective operating levers.

Similarly, when the second operating device 4B receives a full lever operation and the first operating device 4A receives a partial lever operation, the controller 8 may feed an electrical signal corresponding to the inclination angle of the operating lever of the second operating device 4B as shown in FIG. 2 to one of the solenoid units 33 of the second control valve device 30B, and feed an electrical signal that has been corrected in accordance with the inclination angle of the operating lever of the first operating device 4A so as to increase as shown in FIG. 9 to one of the solenoid units 33 of the first control valve device 30A. For example, the electrical signal that has been corrected in accordance with the inclination angle of the operating lever is an electrical signal corresponding to a value that results from multiplying the inclination angle of the operating lever by a coefficient of 1.03 to 1.5. In this case, the coefficient is a value defined as A2*m*/A2*a*, which is the ratio of the maximum opening area A2*m* to the reference opening area A2*a*. The controller 8 feeds a predetermined command current to the solenoid proportional valve 18 with each passing moment, such that the maximum discharge flow rate Qpm of the pump 11 is a total flow rate that is calculated from the inclination angles of the respective operating levers.

According to the above control, when one of the first operating device 4A and the second operating device 4B receives a full lever operation and the other operating device receives a partial lever operation, the advantageous effect that energy consumption is suppressed is obtained owing to the control valve (3A or 3B) of the control valve device (30A or 30B) corresponding to the operating device receiving the full lever operation, and also, the speed of the actuator in response to the lever operating amount of the operating device receiving the partial lever operation is the same as in normal cases.

(Other Embodiments)

The present invention is not limited to the above-described Embodiments 1 and 2. Various modifications can be made without departing from the spirit of the present invention.

For example, in Embodiment 1, instead of the flow regulator 2A including the stopper 24, the flow regulator 2B connected to the solenoid proportional valve 18 and the controller 8 of Embodiment 2 may be used. In this case, while the operating device 4 is being operated, the controller 8 feeds a command current to the solenoid proportional valve 18, such that the maximum discharge flow rate Qpm is equal to the actuator maximum flow rate Qm. With the use of the flow regulator 2B, even when the rotation speed of the engine varies, by controlling the maximum discharge capacity of the pump 11 (maximum discharge capacity per rotation) in accordance with each rotation speed of the engine by the solenoid proportional valve 18, the maximum discharge flow rate of the pump 11 can be controlled to be a certain constant value. This makes it possible to obtain an advantageous effect that energy consumption is suppressed at various rotation speeds of the engine. However, in the case of using the flow regulator 2A including the stopper 24, the advantageous effect that energy consumption is suppressed can be obtained without using electrical components.

In Embodiments 1 and 2, the control valve 3, the first control valve 3A, and the second control valve 3B are three-position valves. However, as an alternative, the control valves in the present invention may be two-position valves.

The hydraulic drive system according to the present invention is useful for various machines, such as industrial machines and construction machines.

REFERENCE SIGNS LIST

1A, 1B hydraulic drive system
11 pump
12 supply line
18 solenoid proportional valve
2A, 2B flow regulator
21 servo piston
22 first pressure receiving chamber
23 second pressure receiving chamber
24 stopper
25 differential pressure regulating valve
3 control valve
3A first control valve
3B second control valve
30 control valve device
30A first control valve device
30B second control valve device
33 solenoid unit
4 operating device
4A first operating device
4B second operating device
51 pressure compensation line
52 pressure compensation valve
7 actuator
7A first actuator
7B second actuator
71 supply/discharge line
8 controller

The invention claimed is:

1. A hydraulic drive system comprising:

a control valve device including a control valve that controls supply and discharge of a hydraulic oil to and from an actuator;

an operating device including an operating lever, the operating device moving the control valve device;

a variable displacement pump connected to the control valve by a supply line; and a flow regulator that controls a discharge flow rate of the pump, wherein the control valve device is configured such that when an inclination angle of the operating lever becomes a predetermined value approximating a maximum value, an opening area of the control valve becomes a reference opening area, and when the inclination angle of the operating lever increases from the predetermined value to the maximum value, the opening area increases from the reference opening area to a maximum opening area, and the flow regulator:

until the inclination angle of the operating lever becomes the predetermined value, increases the discharge flow rate of the pump in accordance with the inclination angle of the operating lever, such that a differential pressure between a discharge pressure of the pump and a load pressure of the actuator is constant;

when the inclination angle of the operating lever becomes the predetermined value, controls the discharge flow rate of the pump, such that a passing flow rate of the control valve is an actuator maximum flow rate in a case where the differential pressure is constant; and when the inclination angle of the operating lever is between the predetermined value and the maximum value, defines a maximum discharge flow rate of the pump, such that the discharge flow rate of the pump is kept to the actuator maximum flow rate.

2. The hydraulic drive system according to claim 1, wherein the flow regulator includes:

a differential pressure regulating valve that reduces the discharge pressure of the pump based on the differential pressure between the discharge pressure of the pump and the load pressure of the actuator and outputs a control pressure;

a servo piston having a smaller-diameter end portion and a larger-diameter end portion, the smaller-diameter end portion being exposed in a first pressure receiving chamber, into which the discharge pressure of the pump is introduced, the larger-diameter end portion being exposed in a second pressure receiving chamber, into which the control pressure outputted from the differential pressure regulating valve is introduced; and a stopper that defines the maximum discharge flow rate and that comes into contact with the larger-diameter end portion of the servo piston.

3. The hydraulic drive system according to claim 1, further comprising:

a solenoid proportional valve that outputs a secondary pressure to the flow regulator; and a controller that controls the solenoid proportional valve, wherein the flow regulator is configured to change the maximum discharge flow rate in accordance with the secondary pressure outputted from the solenoid proportional valve, and while the operating device is being operated, the controller feeds a command current to the solenoid proportional valve, such that the maximum discharge flow rate is equal to the actuator maximum flow rate.

4. A hydraulic drive system comprising:

a first control valve device including a first control valve that controls supply and discharge of a hydraulic oil to and from a first actuator;

a second control valve device including a second control valve that controls supply and discharge of the hydraulic oil to and from a second actuator;

a first operating device including an operating lever, the first operating device moving the first control valve device;

a second operating device including an operating lever, the second operating device moving the second control valve device;

a variable displacement pump connected to the first control valve and the second control valve by a supply line;

a flow regulator that controls a discharge flow rate of the pump;

a solenoid proportional valve that outputs a secondary pressure to the flow regulator; and a controller that controls the solenoid proportional valve, wherein each of the first control valve device and the second control valve device includes solenoid units each being configured to change a pilot pressure intended for moving the control valve in accordance with an electrical signal fed from the controller, and each control valve device is configured such that, in a case where the corresponding operating device is operated singly, when an inclination angle of the operating lever of the operating device becomes a predetermined value approximating a maximum value, an opening area of the control valve of the control valve device becomes a reference opening area, and when the inclination angle of the operating lever increases from the predetermined value to the maximum value, the opening area increases from the reference opening area to a maximum opening area, each of the first operating device and the second operating device is an electrical joystick that outputs an electrical signal whose magnitude corresponds to the inclination angle of the operating lever to the controller, the flow regulator:

until the inclination angle of the operating lever of one of the first operating device and the second operating device, the one operating device corresponding to an actuator with a load higher than that of the other actuator, becomes the predetermined value, increases the discharge flow rate of the pump in accordance with the inclination angle of the operating lever, such that a differential pressure between a discharge pressure of the pump and a load pressure of the actuator corresponding to the one operating device is constant; and when the inclination angle of the operating lever of the one operating device becomes the predetermined value, controls the discharge flow rate of the pump, such that a passing flow rate of the corresponding control valve is an actuator maximum flow rate in a case where the differential pressure is constant, and the controller:

when the inclination angle of the operating lever of the first operating device is between the predetermined value and the maximum value and the inclination angle of the operating lever of the second operating device is between zero and the predetermined value, feeds an electrical signal to one of the solenoid units of the first control valve device, the electrical signal causing the opening area of the first control valve to be the reference opening area, and feeds an electrical signal corresponding to the inclination angle of the operating lever of the second operating device to one of the solenoid units of the second control valve device; and when the inclination angle of the operating lever of the second operating device is between the predetermined value and the maximum value and the inclination angle of the operating lever of the first operating device is between zero and the predetermined value, feeds an electrical signal to one of the solenoid units of the second control valve device, the electrical signal causing the opening area of the second control valve to be the reference opening area, and feeds an electrical signal corresponding to the inclination angle of the operating lever of the first operating device to one of the solenoid units of the first control valve device.

5. A hydraulic drive system comprising:

a first control valve device including a first control valve that controls supply and discharge of a hydraulic oil to and from a first actuator;

a second control valve device including a second control valve that controls supply and discharge of the hydraulic oil to and from a second actuator;

a first operating device including an operating lever, the first operating device moving the first control valve device;

a second operating device including an operating lever, the second operating device moving the second control valve device;

a variable displacement pump connected to the first control valve and the second control valve by a supply line;

a flow regulator that controls a discharge flow rate of the pump;

a solenoid proportional valve that outputs a secondary pressure to the flow regulator; and a controller that controls the solenoid proportional valve, wherein each of the first control valve device and the second control valve device includes solenoid units each being configured to change a pilot pressure intended for moving the control valve in accordance with an electrical signal fed from the controller, and each control valve device is configured such that, in a case where the corresponding operating device is operated singly, when an inclination angle of the operating lever of the operating device becomes a predetermined value approximating a maximum value, an opening area of the control valve of the control valve device becomes a reference opening area, and when the inclination angle of the operating lever increases from the predetermined value to the maximum value, the opening area increases from the reference opening area to a maximum opening area, each of the first operating device and the second operating device is an electrical joystick that outputs an electrical signal whose magnitude corresponds to the inclination angle of the operating lever to the controller, the flow regulator:

until the inclination angle of the operating lever of one of the first operating device and the second operating device, the one operating device corresponding to an actuator with a load higher than that of the other actuator, becomes the predetermined value, increases the discharge flow rate of the pump in accordance with the inclination angle of the operating lever, such that a differential pressure between a discharge pressure of the pump and a load pressure of the actuator corresponding to the one operating device is constant; and when the inclination angle of the operating lever of the one operating device becomes the predetermined value, controls the discharge flow rate of the pump, such that a passing flow rate of the corresponding control valve is an actuator maximum flow rate in a case where the differential pressure is constant, and the controller:

when the inclination angle of the operating lever of the first operating device is between the predetermined value and the maximum value and the inclination angle of the operating lever of the second operating device is between zero and the predetermined value, feeds an electrical signal corresponding to the inclination angle of the operating lever of the first operating device to one of the solenoid units of the first control valve device, and feeds an electrical signal that has been corrected in accordance with the inclination angle of the operating lever of the second operating device to one of the solenoid units of the second control valve device; and when the inclination angle of the operating lever of the second operating device is between the predetermined value and the maximum value and the inclination angle of the operating lever of the first operating device is between zero and the predetermined value, feeds an electrical signal corresponding to the inclination angle of the operating lever of the second operating device to one of the solenoid units of the second control valve device, and feeds an electrical signal that has been corrected in accordance with the inclination angle of the operating lever of the first operating device to one of the solenoid units of the first control valve device.

6. The hydraulic drive system according to claim 1, further comprising:

a pressure compensation line that leads the hydraulic oil flowing from the supply line and passing through the control valve to one of a pair of supply/discharge lines intended for the actuator via the control valve; and a pressure compensation valve provided on the pressure compensation line.

7. The hydraulic drive system according to claim 4, further comprising:

pressure compensation lines, each of which leads the hydraulic oil flowing from the supply line and passing through the first or second control valve to one of a pair of supply/discharge lines intended for a corresponding one of the actuators via the control valve; and pressure compensation valves provided on the respective pressure compensation lines.

8. The hydraulic drive system according to claim 2, further comprising:

a pressure compensation line that leads the hydraulic oil flowing from the supply line and passing through the control valve to one of a pair of supply/discharge lines intended for the actuator via the control valve; and a pressure compensation valve provided on the pressure compensation line.

9. The hydraulic drive system according to claim 3, further comprising:

a pressure compensation line that leads the hydraulic oil flowing from the supply line and passing through the control valve to one of a pair of supply/discharge lines intended for the actuator via the control valve; and a pressure compensation valve provided on the pressure compensation line.

10. The hydraulic drive system according to claim 5, further comprising:

pressure compensation lines, each of which leads the hydraulic oil flowing from the supply line and passing through the first or second control valve to one of a pair of supply/discharge lines intended for a corresponding one of the actuators via the control valve; and pressure compensation valves provided on the respective pressure compensation lines.

* * * * *